United States Patent
Hyung et al.

(10) Patent No.: US 8,644,859 B2
(45) Date of Patent: Feb. 4, 2014

(54) APPARATUS TO PROVIDE AUGMENTED REALITY SERVICE USING LOCATION-BASED INFORMATION AND COMPUTER-READABLE MEDIUM AND METHOD OF THE SAME

(75) Inventors: Seung Yong Hyung, Yongin-si (KR); Kyung Shik Roh, Seongnam-si (KR); Suk June Yoon, Seoul (KR); Sung Hwan Ahn, Anyang-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 290 days.

(21) Appl. No.: 12/977,536

(22) Filed: Dec. 23, 2010

(65) Prior Publication Data

US 2011/0165893 A1 Jul. 7, 2011

(30) Foreign Application Priority Data

Jan. 4, 2010 (KR) .................. 10-2010-0000273

(51) Int. Cl.
*H04W 24/00* (2009.01)

(52) U.S. Cl.
USPC ............... 455/457; 455/556.1; 455/456.5

(58) Field of Classification Search
USPC ................... 455/457, 556.1, 456.5
See application file for complete search history.

(56) References Cited

U.S. PATENT DOCUMENTS

| | | | | |
|---|---|---|---|---|
| 7,630,737 | B2 * | 12/2009 | Pande et al. ............... | 455/556.1 |
| 7,796,155 | B1 * | 9/2010 | Neely et al. ............... | 348/157 |
| 2008/0268876 | A1 * | 10/2008 | Gelfand et al. ............. | 455/457 |
| 2010/0328344 | A1 * | 12/2010 | Mattila et al. ............. | 345/633 |

\* cited by examiner

*Primary Examiner* — Ajit Patel
*Assistant Examiner* — Julio Perez
(74) *Attorney, Agent, or Firm* — Staas & Halsey LLP

(57) ABSTRACT

An augmented reality (AR) service apparatus includes a camera to capture an actual image, a controller to receive feature point information about the captured image from at least one of a plurality of base stations (BSs), detect a location of the camera by matching data of feature points with data of the image, and provide location-based information in a same direction as the captured image according to the location of the camera, and a display to realize an AR service by combining the captured image with the location-based information under control of the controller.

15 Claims, 7 Drawing Sheets

APPARATUS TO PROVIDE AUGMENTED REALITY SERVICE USING LOCATION-BASED INFORMATION AND COMPUTER-READABLE MEDIUM AND METHOD OF THE SAME

CROSS-REFERENCE TO RELATED APPLICATIONS

This application claims the benefit of Korean Patent Application No. 10-2010-0000273, filed on Jan. 4, 2010 in the Korean Intellectual Property Office, the disclosure of which is incorporated herein by reference.

BACKGROUND

1. Field

Example embodiments relate to an apparatus to provide an Augmented Reality (AR) service by combining a real camera image with local information provided by a location-based service, and a computer-readable medium and method of the same.

2. Description of the Related Art

Owing to the recent development of mobile communication, Location-Based Service (LBS) is attracting more interest. LBS provides specific information to a wireless Internet user or a mobile terminal (e.g. smartphone) user according to the location of the user. By providing the user with customized local information, LBS may create a variety of information. Thus LBS affords an almost unlimited potential for applicability. Examples of LBS include searching for local information about a neighborhood or a nearby facility such as a gas station, a restaurant, etc., and locating another person. As a result, LBS offers actual useful information.

A mobile terminal equipped with a camera, captures an image by the camera and projects the captured image on a display. Hence a technique to combine the captured image with local information provided by LBS and display the combination onto the display in the terminal may be implemented. Accordingly, an Augmented Reality (AR) service may be deployed. The AR is a hybrid virtual reality that adds a virtual environment into a real environment by overlaying Three-Dimensional (3D) virtual objects onto a real camera image that a user views. With AR, the user may make the most use of the advantages of LBS which links the virtual world to the real world.

Conventionally, an AR service is deployed by tracking the current location of a camera with the aid of a Base Station (BS) of a mobile communication network and combining a camera image with a virtual image in real time, or by extracting a feature point (an image patch) to detect the current location and posture of a camera and positioning a 3D graphic or 3D information at an intended position by Simultaneous Localization And Mapping (SLAM).

However, the BS-based location tracking method has limited accuracy because a BS basically covers a large area, whereas the SLAM-based feature point extraction method requires a huge amount of information to implement AR over an entire area (e.g. nationwide or worldwide) and the huge amount of information may not be stored in a terminal, because SLAM performs localization and mapping simultaneously.

SUMMARY

Therefore, it is an aspect of the example embodiments to provide an apparatus, computer-readable medium and method of providing an Augmented Reality (AR) service using both a BS-based location tracking technique and a Simultaneous Localization And Mapping (SLAM)-based feature point detection technique by dividing an area for each BS, and allowing the BS to manage image patch data regarding the divided area. As a result, a user terminal needs less information.

The foregoing and/or other aspects are achieved by providing an apparatus to provide an augmented reality (AR) service using location-based information in a user terminal communicating with a plurality of base stations (BSs), including a camera to capture an actual image, a controller to receive feature point information about the captured image from at least one of the plurality of BSs, detect a location of the camera by matching data of feature points with data of the image, and provide location-based information in a same direction as the captured image according to the location of the camera, and a display to provide an AR service by combining the captured image with the location-based information under control of the controller.

The plurality of BSs may segment an area where the user terminal is located into cells and manage feature point information and location-based information about the cells.

The apparatus may further include a transceiver to communicate with the plurality of BSs, and the controller may search for a connectable BS among the plurality of BSs through the transceiver, receive location information about all found BSs, and detect a location of the user terminal based on the location information.

The controller may request transmission of image patch data corresponding to the feature points to a BS according to the location of the user terminal.

The controller may receive the image patch data corresponding to the feature points from the BS and match the image patch data with the captured image in a one-to-one correspondence.

If the feature points are matched, the controller may acquire information about a current location and position of the camera by tracking the feature points.

The foregoing and/or other aspects are achieved by providing a method of providing an augmented reality (AR) service using location-based information in a user terminal communicating with a plurality of base stations (BSs), including capturing an actual image by a camera, detecting, by a processor, a location of the user terminal by searching for connectable BSs among the plurality of BSs, requesting, by the processor, feature point data of the captured image from a BS according to the location of the user terminal, receiving, by the processor, the feature point data from the BS and detecting a location of the camera by matching the feature point data with data of the captured image, and providing, by the processor, an AR service by combining the captured image with location-based information in a same direction according to the location of the camera.

Location information may be requested by all found BSs, and upon receipt of the location information, the location of the user terminal may be detected based on the location information and times of arrival of the location information.

A cell where the user terminal is located may be identified and the feature point data of the captured image may be requested by a BS covering the cell.

Information about a current location and posture of the camera may be acquired by receiving image patch data corresponding to feature points from the BS and matching the image patch data with the captured image in a one-to-one correspondence.

The AR service may be provided by combining the captured image with location-based information received from a BS.

According to another aspect of one or more embodiments, there is provided at least one non-transitory computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
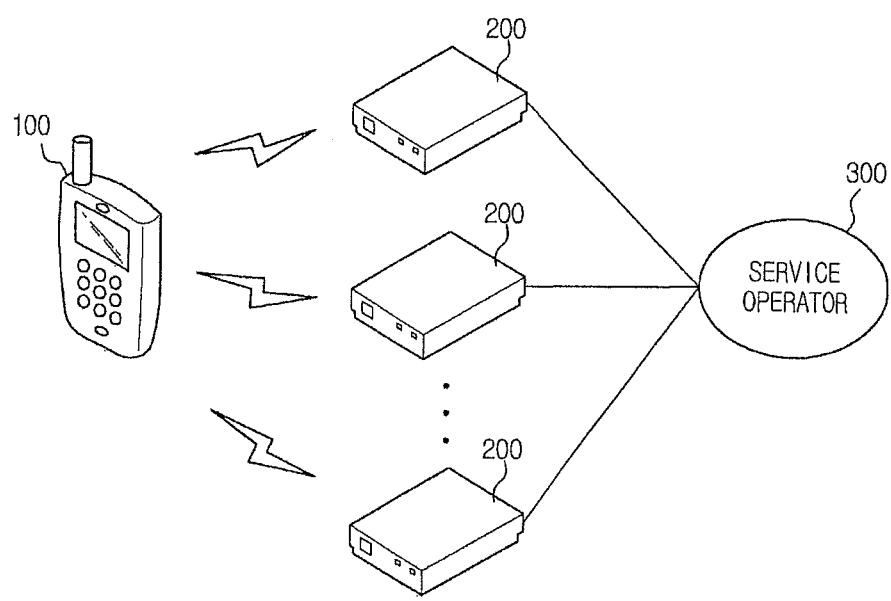
FIG. 1 illustrates an overall configuration of an Augmented Reality (AR) service system using location-based information according to example embodiments.

Reference will now be made in detail to the embodiments, examples of which are illustrated in the accompanying drawings, wherein like reference numerals refer to like elements throughout.

FIG. 1 illustrates an overall configuration of an Augmented Reality (AR) service system using location-based information according to example embodiments.

Referring to FIG. 1, the AR service system using location-based information according to the example embodiments may include a user terminal 100 to realize an AR service using location-based information, a plurality of Base Stations (BSs) 200 to provide the user terminal 100 with the location-based information for the AR service, and a service operator 300 to preliminarily extract feature points from areas where the user terminal 100 may be located and to register the feature points in the plurality of BSs 200. The user terminal 100 may be connected to the plurality of BSs 200 over a network such as an Internet Protocol (IP) network, the Internet, a mobile communication network, a Local Area Network (LAN), etc. in order to communicate.

Figure 2:
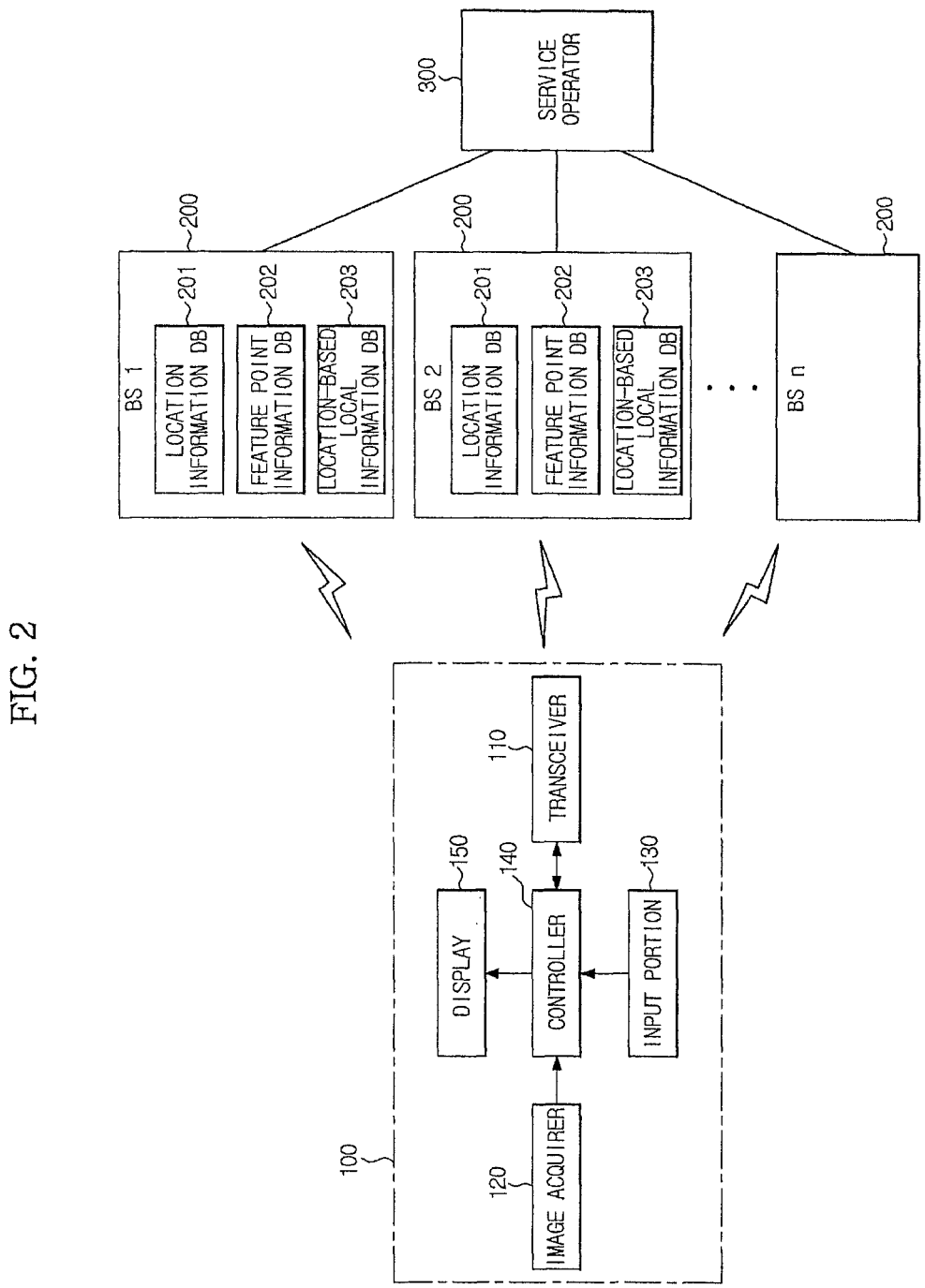
FIG. 2 is a control block diagram illustrating the AR service system using location-based information according to example embodiments.

FIG. 2 is a control block diagram illustrating the AR service system using location-based information according to example embodiments.

Referring to FIG. 2, the user terminal 100 may be a device that realizes an AR service by combining local information provided by Location-Based Service (LBS) with a real camera image. The user terminal 100 may include a transceiver 110, an image acquirer 120, an input portion 130, a controller 140, and a display 150. The user terminal 100 may be a mobile terminal such as a smartphone, a Personal Digital Assistant (PDA), etc.

The transceiver 110 may communicate with the plurality of BSs 200 over a network such as an IP network, the Internet, a mobile communication network, a LAN, etc. under the control of the controller 140.

The image acquirer 120 may capture an image of a current environment that a user is viewing.

The input portion 130 may set a user-desired option (e.g. a location-based AR service request).

The controller 140 may request location-based information from the plurality of BSs 200 upon receipt of a request for the location-based AR service through the input portion 130, receive location-based information about the individual BSs 200 from the BSs 200, and combine the real image acquired by the image acquirer 120 with received location-based information (a virtual image), thereby realizing an AR service.

The controller 140 may search for connectable BSs 200 and Access Points (APs) through the transceiver 110 and request location information from all of the detected BSs 200. Upon receipt of the location information from the BSs 200, the controller 140 may locate the user terminal 100 based on the location information and transmission time (information arrival time).

The controller 140 may identify a cell where the user terminal 100 is located by calculating a cell position using the location of the user terminal 100 and request transmission of a cell number and image patch data corresponding to feature points from a BS 200 covering the cell. Upon receipt of the feature points corresponding to the cell from the BS 200, the controller 140 may match the feature points to the current image acquired by the image acquirer 120 in a one-to-one correspondence. If the image matches the feature points, the controller 140 may acquire information about the current position and posture of a camera by tracking the feature points using a Kalman filter (localization).

Once the current position and posture of the camera are detected, the controller 140 may display an image where virtual information is combined with the camera position information, to realize a service of projecting virtualization information by 3D AR.

The display 150 may display the real image acquired by the image acquirer 120 and location-based information arranged in the same direction to the user under the control of the controller 140. The display 150 may provide the user with an AR service by blending the real image with the location-based information.

The plurality of BSs 200 may be adapted to always communicate with the user terminal 100, for a call and information transmission, and to manage data about areas where the user terminal 100 may be located, i.e., data about BS coverage areas.

Each of the BSs 200 may include a position information Database (DB) 201 to store position information about the BS 200, a feature point information DB 202 to store information about feature points for an area managed by the BS 200, and a location-based local information DB 203 to store location-based local information about the area managed by the BS 200.

The service operator 300 may extract image patch data (feature points) of areas where the user terminal 100 may be located in advance and register the image patch data in the plurality of the BSs 200. The service operator 300 may extract feature point information about the cells allocated to the individual BSs 200 from images captured by cameras. In general, Simultaneous Localization and Mapping (SLAM) may involve localization to detect a location and mapping to register an image. As the service operator 300 may extract feature points in advance and pre-registers maps in the BSs 200, the user terminal 100 needs only to localize itself by monocular SLAM.

Feature points should have quantitative characteristics that are constant against time and at any observation angle. Typically, feature points that are constant at any angle may be found from corner images or image patches.

Figure 3:
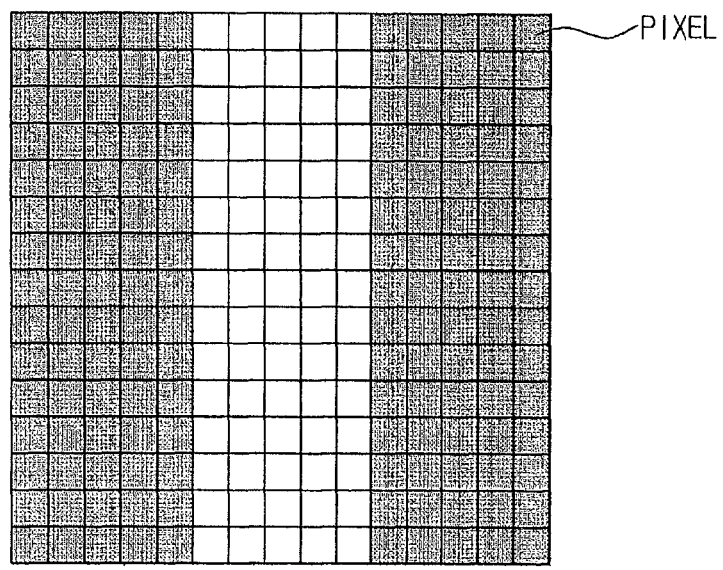
FIG. 3 is a conceptual view of an image patch for feature extraction in the AR service system using location-based information according to example embodiments.

FIG. 3 is a conceptual view of an image patch for feature extraction in the AR service system using location-based information according to example embodiments.

A feature point may be an image patch of 15×15 pixels or a larger size. Data having a high unique value may be extracted as a feature point by a salience operator. Data having distinctive edge characteristics may be extracted from image patches and the data may be easy to identify, compared to other images.

Figure 4:
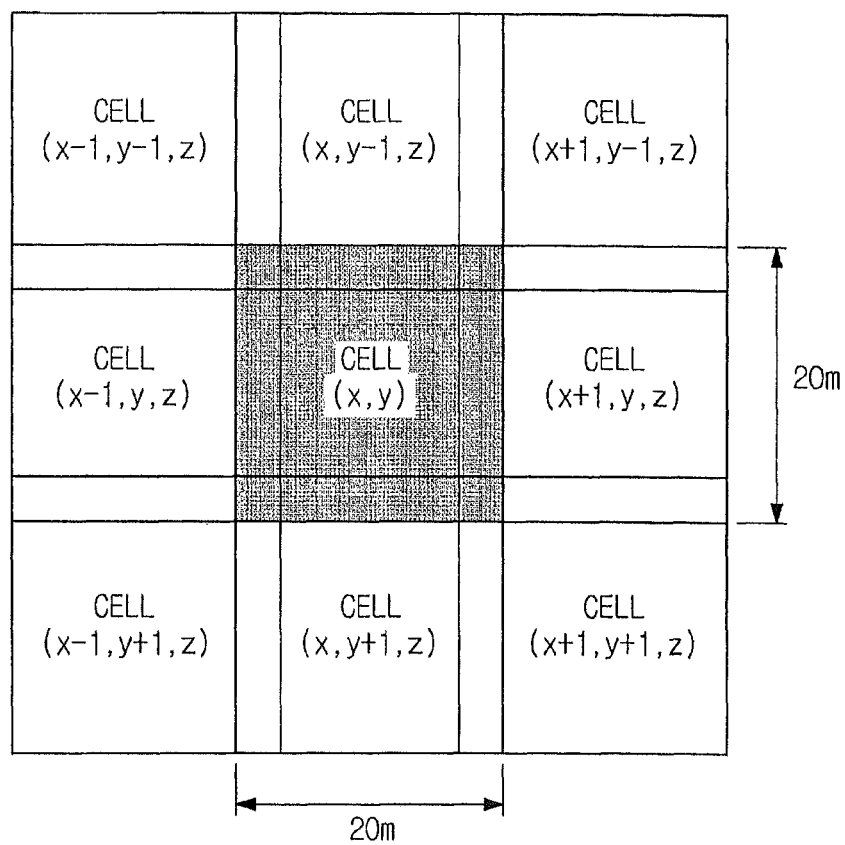
FIG. 4 illustrates basic unit cells allocated to a plurality of Base Stations (BSs) in the AR service system using location-based information according to example embodiments.

FIG. 4 illustrates basic unit cells allocated to a plurality of BSs in the AR service system using location-based information according to example embodiments.

Referring to FIG. 4, 20 m×20 m cells where the user terminal 100 may be located may be allocated to the plurality of BSs 200 and data about the cells may be managed by the BSs 200. Each cell shaped into a square may be overlapped with its adjacent cells by 5 m along each side. The user terminal 100 may notify the plurality of BSs 200 of its location on a basic cell basis.

Each of the BSs 200 may have feature point information about a cell allocated to it. In general, there may be 500 to 1000 pieces of feature point information for each cell. The feature point information may be pixel information and three-dimensional (3D) data information about image patches. The 3D data information may be obtained by monocular localization using a local coordinate system with the south west corner of each cell set as (0, 0, 0) in FIG. 4. The user terminal 100 may identify a cell where the user terminal 100 is located based on location information about each BS 200 received from the BS 200, the transmission time of the location information (i.e. an information arrival time), or identifier (ID) information about the BS 200. When the user terminal 100 requests information about the current cell to which the user terminal 100 belongs, feature point information about the cell may be transmitted to the user terminal 100. If the user terminal 100 enters a common area, i.e. overlapped area between cells, it may receive feature point information from a plurality of BSs 200 and use feature point information common to the BSs 200. Because the user terminal 100 is supposed to manage feature point information (a unique image patch) about an area where the user terminal 100 is located, only data about the area may be quickly transmitted to the user terminal, despite a wide map area. In addition, only a limited number of feature points may be one-to-one matched to feature points in a DB during estimation of a current position and posture in an image, thereby quickly performing a SLAM algorithm.

Figure 5:
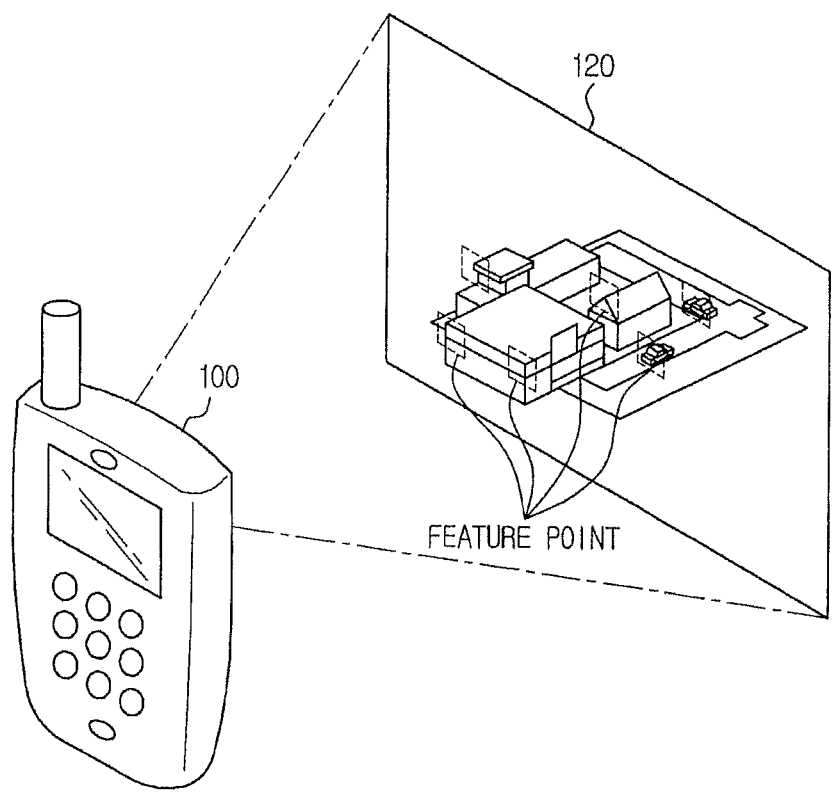
FIG. 5 illustrates feature points distributed across an image in the AR service system using location-based information according to example embodiments.

FIG. 5 illustrates feature points distributed across an image in the AR service system using location-based information according to example embodiments.

Referring to FIG. 5, when the user terminal 100 captures an image of an environment that the user is viewing, a BS 200 that covers an area where the user terminal 100 is located may transmit information about feature points marked with squares to the user terminal 100.

A wide range of location information may not all be stored in the user terminal. Moreover, too much time may be taken for the user terminal 100 to detect its location based on the wide range of location information. Accordingly, an area may be geographically segmented to cells each of about 20 m×20 m, for data management. This may be most efficient in monocular SLAM. Once the user terminal 100 locates itself on a cell basis through BSs 200, it may receive information about feature points of an area where the user terminal 100 is located from a BS 200 covering the area. In this manner, monocular localization may be performed.

For a BS 200 covering a large area, a localization accuracy of 20 m×20 m may be difficult to achieve. Therefore, a time-of-arrival technique is used, and a location may be calculated by checking the times of arrival of signals transmitted from three or more adjacent BSs 200.

On the other hand, for a BS covering a small area, if a wireless network is available due to installation of many Wireless Fidelity (Wi-Fi) APs, the localization accuracy may be increased to a radius of 20 m. Thus, the localization accuracy of 20 m×20 m may be achieved simply with a cell ID, without using a complex technique.

The following is a description of the above AR service apparatus using location-based information and a method of the same in terms of operation and effects.

Figure 6:
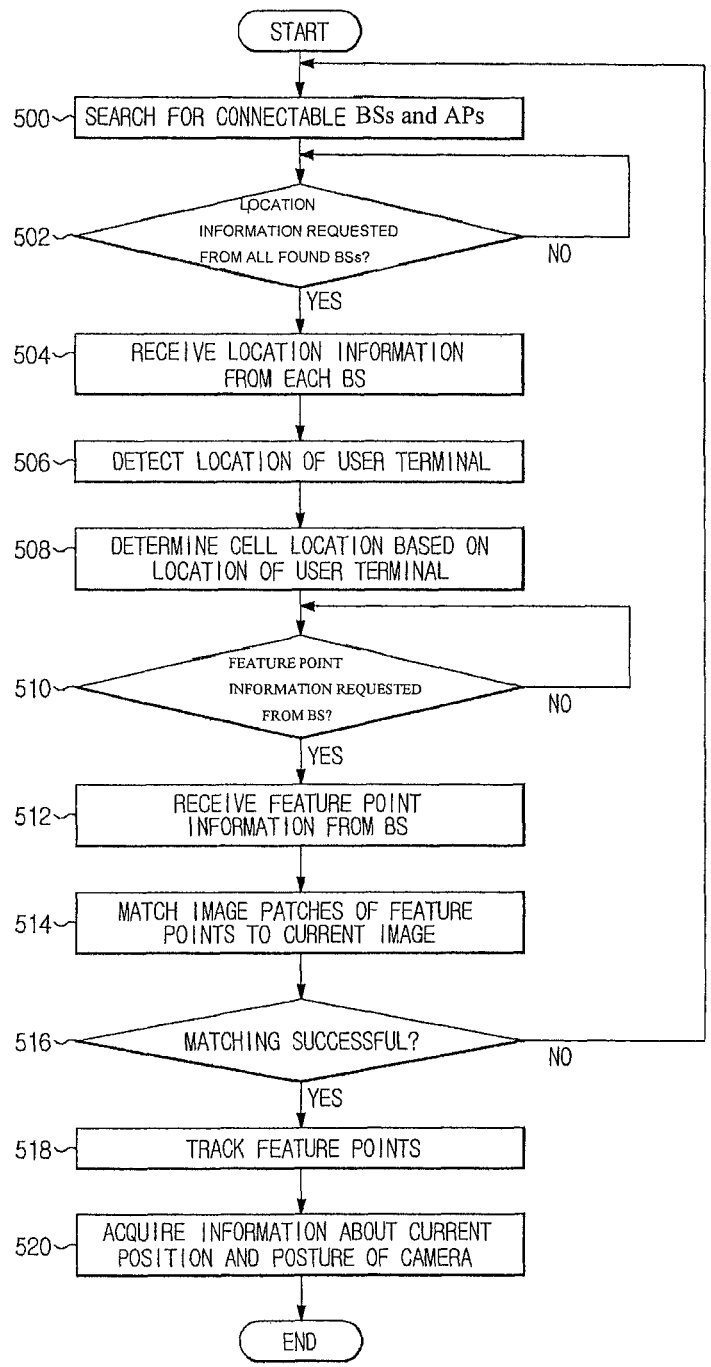
FIG. 6 is a flowchart illustrating a localization operation using location-based information in an AR service method using location-based information according to example embodiments.

FIG. 6 is a flowchart illustrating a localization operation using location-based information in an AR service method using location-based information according to example embodiments.

Referring to FIG. 6, the controller 140 of the user terminal 100 may search for connectable BSs 200 and APs through the transceiver 110 in 500 and request location information from all of the detected BSs 200 in 502.

Upon receipt of the location information request from the user terminal 100, the BSs 200 transmit their location information to the user terminal 100.

Upon receipt of the location information from the BSs 200 in 504, the controller 104 may detect the location of the user terminal 100 based on the location information and the times of arrival of the location information from the BSs 200 in 506.

In 508, the controller 140 may calculate a cell position based on the location of the user terminal 100 and identify a cell where the user terminal 100 is currently located. Then the controller 140 may request a cell number and image patch data corresponding to feature points from a BS 200 covering the cell in 510.

Upon receipt of the feature point information request from the user terminal 100, the BS 200 may transmit stored feature point information about the cell to the user terminal 100.

Upon receipt of the feature point information in 512, the controller 140 should match the feature points to the current image captured by the image acquirer 120 and a DB of feature points. Since pixels of the image corresponding to the pixels of the feature points are not known, feature points having similar unique values may be matched. Once a few feature points with similar unique values are matched, the same relationship may be established among feature points.

After the feature points are matched in 516, the feature points may be tracked using a Kalman filter in 518 and information about the current position and posture of the camera may be updated in 520. After an initial matching, estimation and updating may be repeated based on a self-camera movement model, for posture calibration of the user terminal 100. Hence, a large amount of time may not be required and estimation may be stably performed. After matching, feature points may be tracked using an extended Kalman filter.

When the current location and posture of the camera are detected in the localization of FIG. 6, virtual information may be superimposed on location information on the display 150. For example, an image captured by the camera may be provided together with information arranged in the same direction as the captured image, to realize an AR service visually. For instance, when a user executes a destination search, a direction may be directly notified to the user by projecting an arrow on an image. When the user wants to find an intended item in a store or a large shopping mall, information about the position of the item may be provided to the user immediately.

Figure 7:
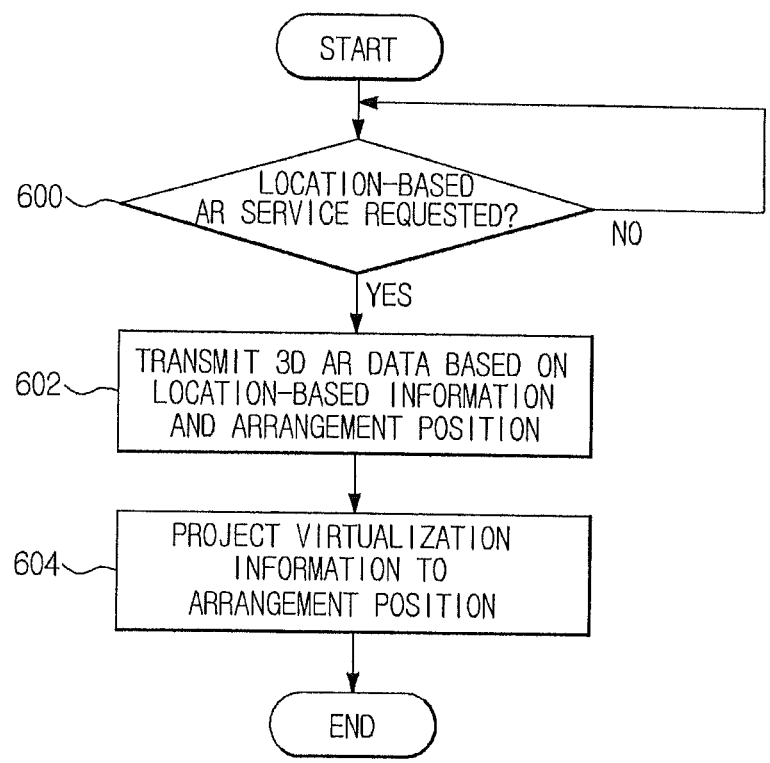
FIG. 7 is a flowchart illustrating an AR realization operation in the AR service method using location-based information according to example embodiments.

FIG. 7 is a flowchart illustrating an AR realization operation in the AR service method using location-based information according to example embodiments.

Referring to FIG. 7, the user may set an intended option, i.e., a location-based AR service request through the input portion 130 in 600.

The controller 140 may request location-based information from a BS 200.

The BS 200 may transmit stored AR data such as data about a 3D virtual object of information object and coordinates (arrangement position) of the AR data for location-based information (i.e. local information) to the user terminal 100.

Upon receipt of the 3D AR data and arrangement position information of the location-based information (i.e. the local information) from the BS 200 in 602, the controller 140 may realize an AR service by combining an actual image acquired through the image acquirer 120 with the received location-based information (i.e. a virtual image) and projecting the virtualization information at the arrangement position in 604.

However, the same place may be subjected to gradual environmental changes. Therefore, unless registered feature points are converged with many possibilities, these feature points may be set to be amended. When the matching rate of the registered points is significantly low, the user terminal 100 may operate and a BS may make a candidate with erroneous feature points. However, if an error exceeds a preset threshold, the feature points may be discarded, new feature points may be found, and the new feature points may be registered.

Since an AR service may be realized using location-based information by BS-based localization and monocular SLAM, various LBSs may be provided and a new service may be deployed in accordance with example embodiments. Based on the examples of Google and Daum, providing LBS together with a map may create huge profits. This AR service may be realized in real time during movement and location-based information (local information) may be provided on a screen that a user is viewing in example embodiments. Accordingly, it may be expected that incomparable effects will be generated.

As is apparent from the above description, since the AR service apparatus and method using location-based information according to the example embodiments realize an AR service using location-based information by use of both BS-based location tracking and SLAM-based feature detection, a variety of LBSs may be provided and as a consequence, a new service may be deployed. In addition, location-based information may be directly provided on a terminal screen that a user is viewing. Therefore, the AR service may be provided in real time during movement.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined in the claims and their equivalents.

What is claimed is:

1. An apparatus to provide an augmented reality (AR) service using location-based information in a user terminal communicating with a plurality of base stations (BSs) allocated to at least one cell among a plurality of cells in an area, the apparatus comprising:
    a camera to capture an image;
    a controller, of the user terminal, to:
        obtain first location information of the camera using locations of the BSs to identify a cell where the camera is located,
        receive feature point information from image patches corresponding to the identified cell, from at least one BS allocated to the identified cell,
        detect an updated first location of the camera by matching data of the received feature points to data of the image, and
        provide location-based information in a same direction as the captured image according to the updated first location of the camera;
    a transceiver to communicate with the plurality of BSs, wherein the controller searches for a connectable BS among the plurality of BSs through the transceiver, receives location information about all found BSs, and detects a location of the user terminal based on the location information; and
    a display to provide an AR service by combining the captured image with the location-based information under control of the controller.

2. The apparatus according to claim 1, wherein the plurality of BSs allocated to at least one cell among the plurality of cells manage feature point information and location-based information about the cells to which they are respectively allocated.

3. The apparatus according to claim 1, wherein the controller requests transmission of image patch data corresponding to the feature points from the at least one BS allocated to the identified cell.

4. The apparatus according to claim 3, wherein the controller matches the image patch data with the captured image in a one-to-one correspondence.

5. The apparatus according to claim 4, wherein when the feature points are matched, the controller acquires information about a current location and position of the camera by tracking the feature points using a Kalman filter.

6. A method of providing an augmented reality (AR) service using location-based information in a user terminal communicating with a plurality of base stations (BSs) allocated to at least one cell among a plurality of cells in an area, the method comprising:
    capturing an image by a camera;
    communicating with the plurality of BSs and searching for connectable BSs among the plurality of BSs using a transceiver;
    requesting and receiving location information about all found BSs;
    detecting, by a processor of the user terminal, a location of the user terminal based on the received location information about all found BSs and detecting a cell where the camera is located;
    requesting, by the processor, feature point data corresponding to the captured image to at least one BS allocated to the detected cell;
    receiving, by the processor, the feature point data from image patches corresponding to the detected cell, from the at least one BS allocated to the cell, and detecting an updated location of the camera by matching the received feature point data with data of the captured image; and
    providing, by the processor, an AR service by combining the captured image with location-based information in a same direction according to the location of the camera.

7. The method according to claim 6, wherein the plurality of BSs allocated to at least one cell among the plurality of cells manage feature point information and location-based information about the cells to which they are respectively allocated.

8. The method according to claim 7, wherein the detection of a location of the user terminal further comprises detecting the location of the user terminal based on times of arrival of the location information.

9. The method according to claim 6, wherein the detection of a location of the camera comprises acquiring information about a current location and posture of the camera and matching the image patch data to the captured image in a one-to-one correspondence.

10. The method according to claim 6, wherein the providing of an AR service comprises providing a three-dimensional AR service by combining the image captured by the camera with location-based information received from the BS.

11. At least one non-transitory computer readable medium comprising computer readable instructions that control at least one processor to implement a method, comprising:
    capturing an image by a camera;
    communicating with a plurality of base stations (BSs) and searching for connectable BSs among the plurality of BSs allocated to at least one cell among a plurality of cells in an area, using a transceiver;
    requesting and receiving location information about all found BSs;
    detecting a location of a user terminal based on the received location information about all found BSs;
    detecting a cell where the camera is located in using the detected location of the user terminal;
    requesting feature point data corresponding to the captured image from at least one BS allocated to the detected cell;
    receiving the feature point data from image patches corresponding to the detected cell, from the at least one BS allocated to the cell, and detecting an updated location of the camera by matching the received feature point data with data of the captured image; and
    providing an augmented reality (AR) service by combining the captured image with location-based information in a same direction according to the location of the camera.

12. The at least non-transitory one computer readable medium comprising computer readable instructions that control at least one processor to implement the method of claim 11, wherein
    the plurality of BSs allocated to at least one cell among the plurality of cells manage feature point information and location-based information about the cells to which they are respectively allocated.

13. The at least one non-transitory computer readable medium comprising computer readable instructions that control at least one processor to implement the method of claim 12, wherein the detection of a location of the user terminal further comprises detecting the location of the user terminal based on times of arrival of the location information.

14. The at least one non-transitory computer readable medium comprising computer readable instructions that control at least one processor to implement the method of claim 11, wherein the detection of a location of the camera comprises acquiring information about a current location and posture of the camera and matching the image patch data to the captured image in a one-to-one correspondence.

15. The at least one non-transitory computer readable medium comprising computer readable instructions that control at least one processor to implement the method of claim 11, wherein the providing of an AR service comprises providing a three-dimensional AR service by combining the image captured by the camera with location-based information received from the BS.

* * * * *

UNITED STATES PATENT AND TRADEMARK OFFICE
CERTIFICATE OF CORRECTION

| | |
|---|---|
| PATENT NO. | : 8,644,859 B2 |
| APPLICATION NO. | : 12/977536 |
| DATED | : February 4, 2014 |
| INVENTOR(S) | : Hyung et al. |

Page 1 of 1

It is certified that error appears in the above-identified patent and that said Letters Patent is hereby corrected as shown below:

In the Claims

Column 10, Line 24, In Claim 12, delete "non-transitory one" and insert -- one non-transitory --, therefor.

Signed and Sealed this
Fifth Day of August, 2014

Michelle K. Lee
*Deputy Director of the United States Patent and Trademark Office*